United States Patent
Kanazawa

(10) Patent No.: US 11,295,198 B2
(45) Date of Patent: Apr. 5, 2022

(54) IMPLEMENTATION MODEL OF SELF-ORGANIZING RESERVOIR BASED ON LORENTZIAN NONLINEARITY

(71) Applicant: INTERNATIONAL BUSINESS MACHINES CORPORATION, Armonk, NY (US)

(72) Inventor: Naoki Kanazawa, Kawasaki (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 950 days.

(21) Appl. No.: 15/794,203

(22) Filed: Oct. 26, 2017

(65) Prior Publication Data
US 2019/0130252 A1    May 2, 2019

(51) Int. Cl.
G06N 3/04     (2006.01)
G06N 3/08     (2006.01)

(52) U.S. Cl.
CPC ............ *G06N 3/0445* (2013.01); *G06N 3/08* (2013.01)

(58) Field of Classification Search
CPC .............................. G06N 3/0445; G06N 3/08
See application file for complete search history.

(56) References Cited

U.S. PATENT DOCUMENTS

| | | | |
|---|---|---|---|
| 5,821,824 A * | 10/1998 | Mentzer | H03K 3/0231 331/57 |
| 9,477,136 B2 | 10/2016 | Bienstman et al. | |
| 2013/0329524 A1* | 12/2013 | Lee | G06N 3/049 367/126 |
| 2018/0268285 A1* | 9/2018 | Dasgupta | G06N 3/084 |

FOREIGN PATENT DOCUMENTS

WO    2014/203038 A1    12/2014

OTHER PUBLICATIONS

Tulapurkar et al., "Spin-Torque Diode Effect in Magnetic Tunnel Junctions," in 438(7066) Nature 339-42 (2005). (Year: 2005).*
Fang et al., "Giant Spin-Torque Diode Sensitivity in the Absence of Bias Magnetic Field," in 7.1 Nature Comms. 1-7 (2016). (Year: 2016).*
Antonelo et al., "Imitation Learning of an Intelligent Navigation System for Mobile Robots using Reservoir Computing," in 10th Braz. Symp. Neural Networks 93-98 (2008). (Year: 2008).*

(Continued)

*Primary Examiner* — Kamran Afshar
*Assistant Examiner* — Ryan C Vaughn
(74) *Attorney, Agent, or Firm* — Tutunjian & Bitetto PC; Randall Bluestone

(57) ABSTRACT

To realize a reservoir computing system in which the reservoir is configured to be suitable for various learning targets, provided is a self-organizing reservoir computing system, including an input layer that outputs an input layer signal corresponding to input data; a reservoir layer that includes therein a nonlinear signal path using physical resonance phenomena and is operable to output an inherent reservoir layer signal in response to the input layer signal; and an output layer that outputs output data corresponding to the reservoir layer signal. Also provided is a self-organizing method.

19 Claims, 13 Drawing Sheets

(56) References Cited

OTHER PUBLICATIONS

Torrejon et al., "Neuromorphic Computing with Nanoscale Spintronic Oscillators," in 547 Nature 428-31 (2017). (Year: 2017).*
Coulombe et al., "Computing with Networks of Nonlinear Mechanical Oscillators," in 12(6) PLoS ONE e0178663 (2017). (Year: 2017).*
Widrow et al., "Neural Nets for Adaptive Filtering and Adaptive Pattern Recognition," in 21.3 Computer 25-39 (1988). (Year: 1988).*
Appeltant, L et al., "Constructing Optimized Binary Masks for Reservoir Computing with Delay Systems" Scientific Reports (Jan. 2010) pp. 1-5, vol. 4, No. 3629.
Lukosevicius, M. et al., "Reservoir computing approaches to recurrent neural network training" Computer Science Review (Mar. 2009) pp. 127-149, vol. 3.
Lukosevicius, M., "Self-organized reservoirs and their hierarchies" Lecture Notes in Computer Science Artificial Neural Networks and Machine Learning—ICANN 2012 (Sep. 2012) pp. 1-8, vol. 7552.
Miwa, S et al., "Highly sensitive nanoscale spin-torque diode" Nature Materials (Oct. 2013) pp. 1-7.

\* cited by examiner

IMPLEMENTATION MODEL OF SELF-ORGANIZING RESERVOIR BASED ON LORENTZIAN NONLINEARITY

BACKGROUND

Technical Field

The present invention relates to a reservoir computing system.

Related Art

As a learning method that includes handling time-series data such as voice recognition and stock predictions, a reservoir computing system is known that uses a recursive dynamic network structure referred to as a reservoir.

Such a reservoir computing system learns only the weights of an output mechanism, without changing the weights inside the input mechanism and the reservoir after these weights are initialized with random numbers or the like. Accordingly, a physical device that outputs an output signal that is nonlinear with respect to the input signal can be used as the reservoir. However, it is difficult to actually realize a reservoir as a physical device capable of being mass-produced. Furthermore, in order for the reservoir to output a nonlinear output signal that corresponds to various types of input signals, a redundant structure must be included inside the reservoir. Accordingly, it is difficult to configure reservoirs suitable for various learning targets to realize the reservoir computing system.

SUMMARY

According to a first aspect of the present invention, provided is a self-organizing reservoir computing system, comprising an input layer that outputs an input layer signal corresponding to input data; a reservoir layer that includes therein a nonlinear signal path using physical resonance phenomena and is operable to output an inherent reservoir layer signal in response to the input layer signal; and an output layer that outputs output data corresponding to the reservoir layer signal. Also provided is a self-organizing method.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
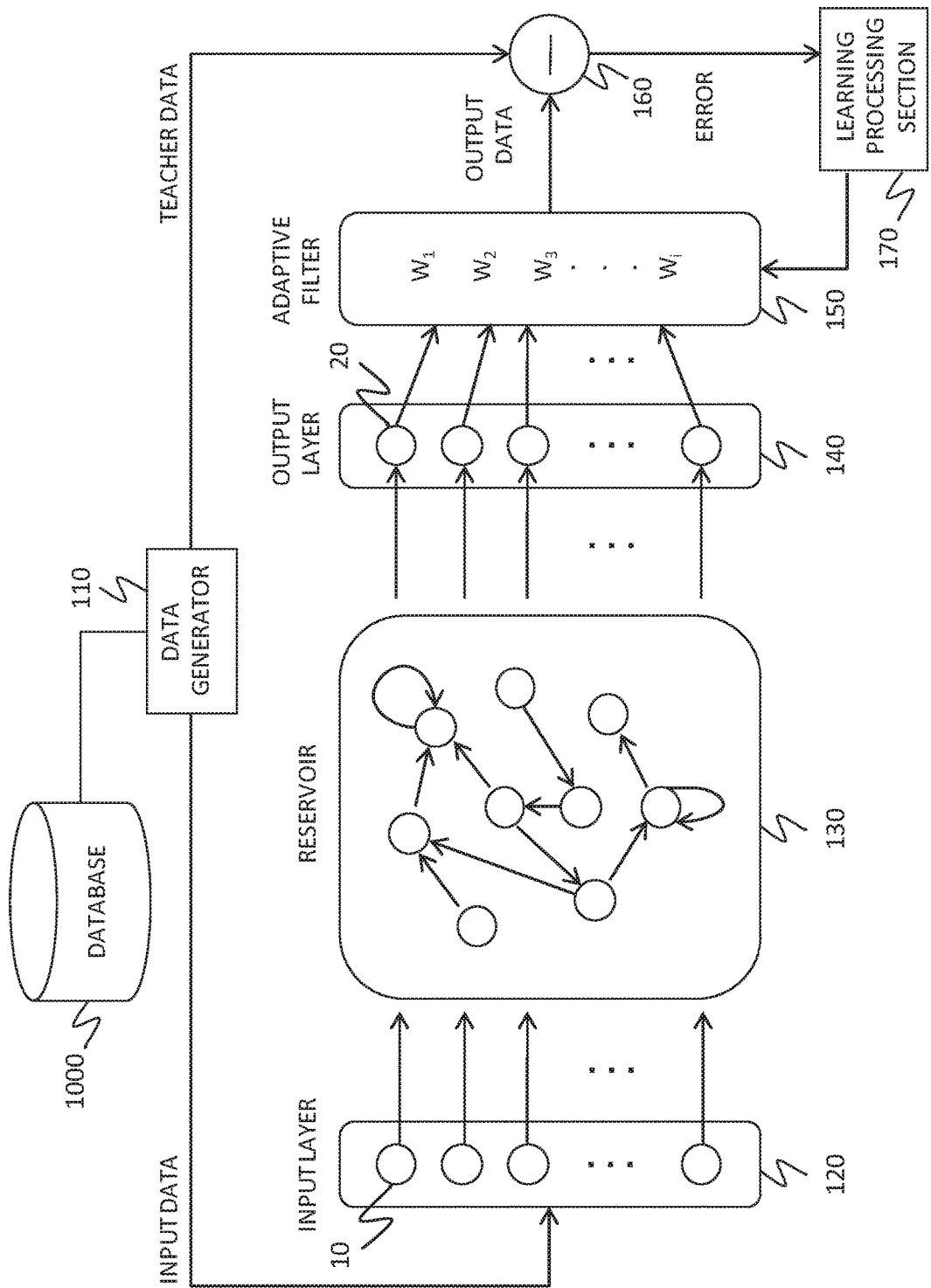
FIG. 1 shows an exemplary configuration of a reservoir computing system 100.

FIG. 1 shows an exemplary configuration of a reservoir computing system 100. The reservoir computing system 100 may be an apparatus that performs learning based on input data, output data, and training data. Furthermore, the reservoir computing system 100 may be operable to perform testing and make predictions for output data corresponding to the input data, based on the learning results. The reservoir computing system 100 adjusts weights in the system, in a manner to reduce the difference between output data that are output in response to the input data and training data corresponding to the input data. The reservoir computing system 100 includes a data generator 110, an input layer 120, a reservoir 130, an output layer 140, an adaptive filter 150, a comparing section 160, and a learning processing section 170.

The data generator 110 may be operable to generate the input data and supply the reservoir computing system 100 with the input data. If the reservoir computing system 100 is performing learning, the data generator 110 may generate training input data and training data corresponding to these input data, and supply the reservoir computing system 100 with these input data and training data. Furthermore, when the reservoir computing system 100 performs a test, makes a prediction, or the like based on learning results, the data generator 110 may generate input data for testing and supply the reservoir computing system 100 with these input data.

The data generator 110 is connected to an external database 1000 or the like, and may be operable to acquire the input data and the training data. Instead, the data generator 110 may generate the input data and the training data, using a predetermined algorithm or the like. The input data are a time-series data sequence in which a plurality of pieces of data are arranged according to the time axis, such as audio data, video data, or the like, for example. Furthermore, the training data may be expected output data that are expected for the input data.

The data generator 110 may read and acquire input data stored in a predetermined format. Furthermore, the data generator 110 may be connected to a network or the like and acquire input data and the like via this network. Instead of or in addition to this, the data generator 110 may be connected to an apparatus manipulated by a user, an apparatus (sensor) that detects and outputs time-series data, or the like, and acquire the time-series input data. The data generator 110 may store the acquired input data and the like in a storage apparatus or the like inside the reservoir computing system 100.

The input layer 120 may be operable to input the input data from the data generator 110. The input layer 120 may include one or more input nodes 10. The input data may be input to one or more corresponding input nodes 10. Each input node 10 may be operable to supply the reservoir 130 with an input signal corresponding to the input data. Each input node 10 may be operable to supply the input signal to one or more corresponding nodes of the reservoir 130. A weight may be set between each input node 10 and one or more corresponding nodes of the reservoir 130. Each input node 10 may supply an input signal that has been multiplied by the weight set for the input data to the one or more corresponding nodes.

The reservoir 130 may be operable to output an inherent output signal in response to the input signal. The reservoir 130 may have a network including a plurality of nodes. The reservoir 130 may have a recurrent type network structure. Each of the plurality of nodes of the reservoir 130 may be a nonlinear node that issues a nonlinear response to the input signal. The plurality of nodes of the reservoir 130 may be virtual nodes. In the network including the reservoir 130, each of the plurality of nodes may supply other corresponding nodes with a response signal corresponding to the input signal. In this case, each of the plurality of nodes may supply the other corresponding nodes with a weighted response signal.

The output layer 140 may be operable to output the response signal output by each node of the reservoir 130. The output layer 140 may include a plurality of output nodes 20. The output layer 140 preferably includes a number of output nodes 20 that is substantially the same as the number of nodes of the reservoir 130. For example, the plurality of output nodes 20 correspond one-to-one with the plurality of nodes of the reservoir 130. Each output node 20 may be operable to output an output value corresponding to the output signal output by the reservoir 130 in response to the input data. Each output node 20 may be operable to output to the adaptive filter 150 an output value of a corresponding node of the reservoir 130.

The adaptive filter 150 may be operable to output the output data based on the output value output from each output node 20. For example, the adaptive filter 150 applies weights corresponding respectively to the output value output by each output node 20, and outputs the result obtained by performing a predetermined calculation as the output data. As an example, the adaptive filter 150 outputs, as the output data, the sum of each of the weighted values of the output values of the output nodes 20. If the number of output nodes 20 is i, for example, the adaptive filter 150 outputs, as the output data, the sum $\Sigma w_i V_i$ of the values obtained by multiplying the n output values $V_i$ by the corresponding n weights ($w_1, w_2, \ldots, w_i$). The adaptive filter 150 may be operable to supply the comparing section 160 with the output data.

The comparing section 160 may be operable to compare the expected output data output by the data generator 110 to the output data output by the adaptive filter 150. For example, the comparing section 160 outputs the difference between the expected output data and the output data as an error. The comparing section 160 may supply the learning processing section 170 with this error as the comparison result.

Furthermore, the comparing section 160 may be operable to perform a comparison operation if the reservoir computing system 100 is learning. The comparing section 160 may be operable to, if the reservoir computing system 100 is performing a test or making a prediction using learning results, output the output data of the adaptive filter 150 to the outside as-is. In this case, the comparing section 160 may be operable to output the output data to an external output apparatus such as a display, a storage apparatus, and an external apparatus such as the database 1000.

The learning processing section 170 may be operable to set the plurality of weights of the adaptive filter 150 according to the comparison results of the comparing section 160. The learning processing section 170 may be operable to set the plurality of weights such that the reservoir computing system 100 outputs the output data that are expected in response to the input data. The learning processing section 170 may be operable to update the plurality of weights in a manner to further reduce the error between the output data output by the adaptive filter 150 in response to the training input data being supplied to the input node 10 and the expected output data that are expected for the training input data. The learning processing section 170 may be operable to operate if the reservoir computing system 100 is learning.

The reservoir computing system 100 described above may be a system capable of learning by updating the weights of the adaptive filter 150. Specifically, the reservoir computing system 100 may be operable to perform learning by updating the weights of the adaptive filter 150 while the weights between the input layer 120 and the reservoir 130 and the weights within the reservoir 130 are fixed at randomly determined initial values, for example.

Furthermore, by fixing the weights of the adaptive filter 150 at the learned weights and inputting input data for testing, the reservoir computing system 100 can output test results or prediction results for the input data for testing. Such a reservoir computing system 100 can simulate a learning operation and a testing operation by performing matrix calculations. Furthermore, if the reservoir computing system 100 is a physical device that outputs a nonlinear output signal in response to an input signal, the reservoir computing system 100 can be used as a reservoir 130, and is therefore expected to be a system with easy hardware installation.

If the reservoir computing system 100 described above is actually implemented as physical hardware, the reservoir 130 must be realized as hardware that can be connected to physical wiring. Such a reservoir 130 must have nonlinearity with respect to the input/output characteristic. Furthermore, if the reservoir 130 is to process a time-series signal, for example, the reservoir 130 preferably has a fading memory function, by which a portion of the input signal is stored only for at least a certain duration. Furthermore, the reservoir 130 is preferably able to convert a signal into a higher-order signal.

The reservoir 130 preferably outputs a nonlinear output signal corresponding to various types of input signals. Furthermore, the reservoir 130 preferably operates stably while reducing the effect of fluctuations in the external environment. Yet further, such a reservoir 130 can preferably be manufactured easily and with a small size. Therefore, the reservoir computing system according to the present embodiment is operable to be implemented as hardware using a self-organizing reservoir (SOR). First, a nonlinear signal path forming the SOR is described.

Figure 2:
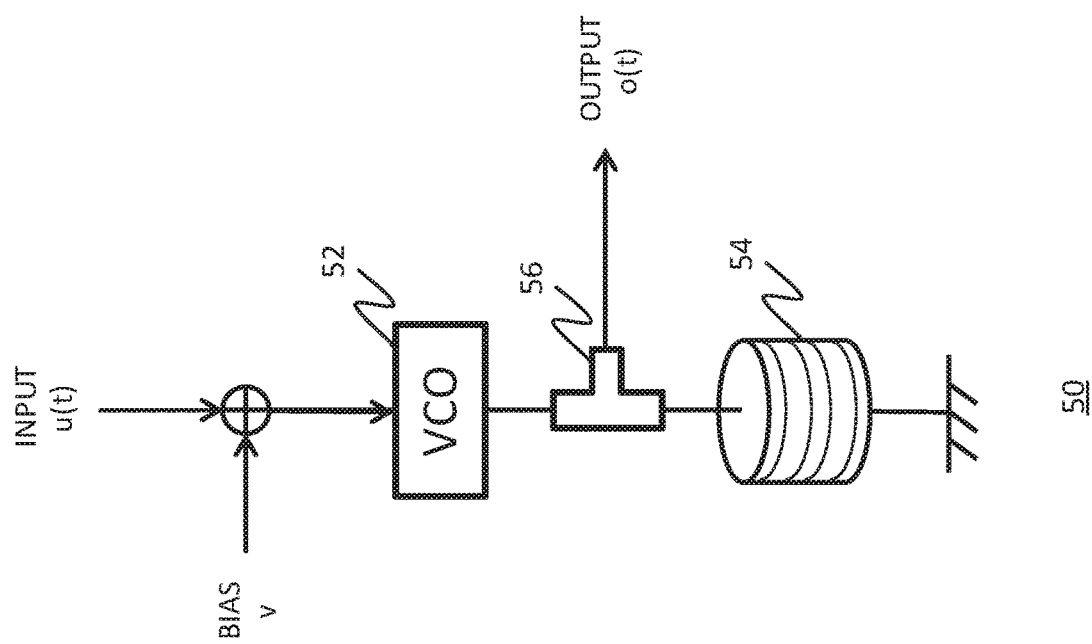
FIG. 2 shows a nonlinear signal path 50 according to the present embodiment.

FIG. 2 shows a nonlinear signal path 50 according to the present embodiment. The nonlinear signal path 50 may output a nonlinear signal o(t) corresponding to an input signal u(t), using physical resonance phenomena. The nonlinear signal path 50 may use elements that generate ferromagnetic resonance (FMR) or Plasmon resonance. The nonlinear signal path 50 includes an oscillator 52, a nonlinear transducer 54, and an input/output circuit 56.

The oscillator 52 may output a signal with a frequency corresponding to an input signal. The oscillator 52 may be a voltage controlled oscillator (VCO) that outputs a signal with a frequency corresponding to the voltage of the input signal. The signal input to the oscillator 52 may have a bias voltage v serving as an offset added thereto. In other words, the oscillator 52 outputs a signal f(t) with a frequency corresponding to a voltage I(t)=u(t)+v obtained by adding together the voltage of the input signal u(t) and the bias voltage v.

The nonlinear transducer 54 may output the signal o(t) that is nonlinear with respect to the frequency of the signal f(t) output by the oscillator 52. The nonlinear transducer 54 may include a spin torque diode (STD) that outputs a signal having a voltage that is nonlinear with respect to the frequency of the signal f(t) output by the oscillator 52. The STD is known as an element that is supplied with a high-frequency signal between one end and another end thereof, and generates DC voltage corresponding to the frequency of this high-frequency signal.

The STD may have a three-layer structure in which a non-magnetic insulator such as MgO is sandwiched between ferromagnetic layers in a direction substantially perpendicular to the direction in which the current flows, and one of these ferromagnetic layers may operate as a free magnetic layer. When such an STD is supplied with the high-frequency signal and the frequency of this high-frequency signal matches the (ferromagnetic) resonance frequency of the magnetism of the free magnetic layer, a resonance phenomenon occurs that alternates the electric resistance, and as a result the STD causes a spin torque diode effect to generate a relatively large DC voltage at both ends. The STD generates such resonance phenomena in a GHz frequency range, and therefore a DC magnetic field of approximately several hundred mT may be applied. In this way, the nonlinear transducer 54 may have a function to selectively rectify the frequency, and may output the nonlinear signal o(t) according to the input frequency signal f(t).

The input/output circuit 56 includes a first terminal connected to the oscillator 52, a second terminal connected to the nonlinear transducer 54, and a third terminal that outputs the DC voltage output from the nonlinear transducer 54, i.e., the nonlinear signal o(t). The input/output circuit 56 may operate to allow the frequency signal f(t) output by the oscillator 52 to pass from the first terminal to the second terminal, but not allow the nonlinear signal o(t) output from the nonlinear transducer 54 to pass from the second terminal to the first terminal. Furthermore, the input/output circuit 56 may operate to allow the nonlinear signal o(t) to pass from the second terminal to the third terminal, but not allow this nonlinear signal o(t) to pass from the second terminal to the first terminal. The input/output circuit 56 may be a bias T, for example.

Figure 3:
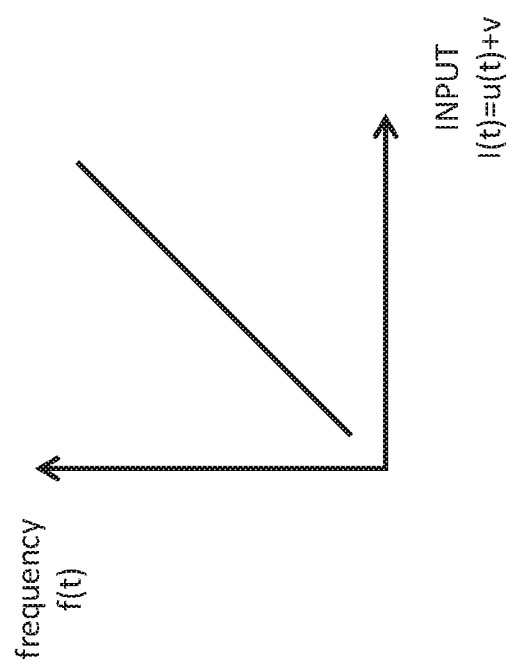
FIG. 3 shows an exemplary input/output characteristic of an oscillator 52 according to the present embodiment.

The following explains the input/output characteristic of each section of such a nonlinear signal path 50. FIG. 3 shows an exemplary input/output characteristic of the oscillator 52 according to the present embodiment. In FIG. 3, the horizontal axis indicates the input voltage I(t) of the oscillator 52 and the vertical axis indicates the output frequency f(t) of the oscillator 52. As shown in the example of FIG. 3, the output frequency f(t) has an approximately linear characteristic with respect to the input voltage I(t) of the oscillator 52.

Here, the input voltage I(t) of the oscillator 52 may be a voltage that is less than or equal to approximately several volts, and is a voltage that is less than or equal to 1 volt, for example. The output frequency f(t) of the oscillator 52 may be a frequency of approximately several GHz. Furthermore, the output frequency f(t) of the oscillator 52 may be capable of being changed within a frequency range of approximately several hundred MHz, according to the input voltage I(t).

Figure 4:
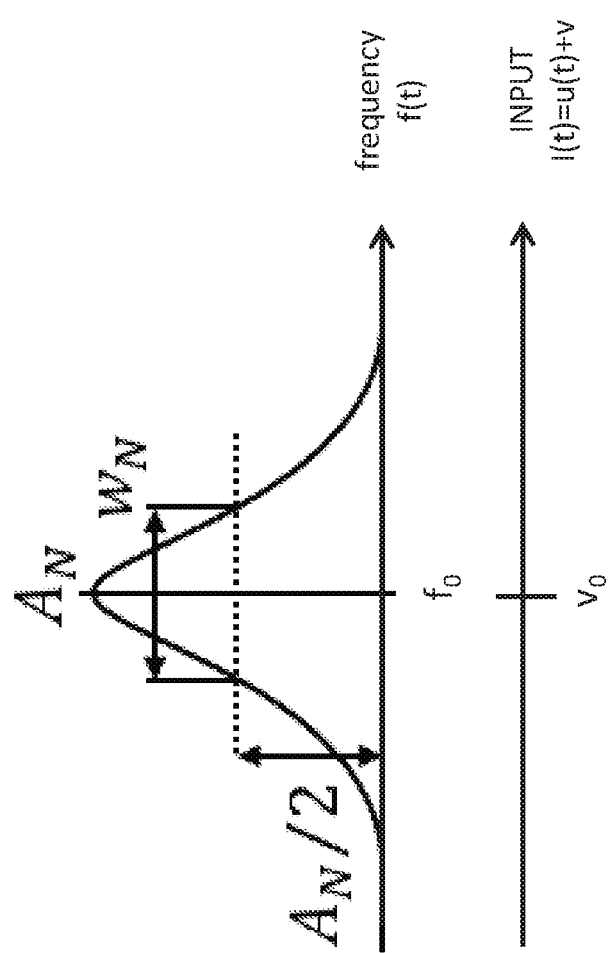
FIG. 4 shows an exemplary input/output characteristic of a nonlinear transducer 54 according to the present embodiment.

FIG. 4 shows an exemplary input/output characteristic of the nonlinear transducer 54 according to the present embodiment. In FIG. 4, the horizontal axis indicates the input signal of the nonlinear transducer 54, i.e. the output frequency f(t) of the oscillator 52, and the vertical axis indicates the output signal o(t) of the nonlinear transducer 54. As shown in the example of FIG. 4, the output signal o(t) may have a nonlinear characteristic with respect to the input signal of the nonlinear transducer 54. The nonlinear transducer 54 may have a characteristic of causing a peak in the output voltage for a prescribed frequency input.

Here, the resonance frequency $f_0$ of the nonlinear transducer 54 may be a frequency of approximately several GHz. Furthermore, the absolute value $A_N$ of the peak of the output signal o(t) of the nonlinear transducer 54 may be approximately several hundred μV. The nonlinear transducer 54 uses natural phenomena, which are the resonance phenomena of the STD, and therefore it is possible to show the input/output characteristic as a Lorentz function. Furthermore, the output frequency f(t) of the oscillator 52, which is the input signal of the nonlinear transducer 54, has a substantially linear relationship with the input voltage I(t) of the oscillator 52, and therefore it is also possible to show the output signal o(t) with respect to the input voltage I(t) as a Lorentz function.

FIG. 4 shows an example in which an axis for the input voltage I(t) corresponding to the output frequency f(t) of the oscillator 52 has been added. In this way, the output signal o(t) with respect to the input signal u(t) of the nonlinear signal path 50 can be shown as the Lorentz function indicated by the expression below. Here, $w_N$ indicates the half-value of the total width of the Lorentz function, bias voltage $v_0$ is a peak bias voltage and $A_N$ is a magnitude at the half-value width.

$$L(u(t)+v) = \frac{A_N \cdot w_N^2}{4\{v_0 - u(t) - v\}^2 + w_N^2} \qquad \text{Expression 1}$$

In the manner described above, the nonlinear signal path 50 may output a nonlinear signal based on the nonlinear Lorentz function. Accordingly, as an example, it is possible to configure a reservoir layer having a nonlinear input/output response simply by forming the connection between nodes with such a nonlinear signal path 50. Accordingly, by using such a reservoir as the reservoir 130 shown in FIG. 1, it is possible to realize the reservoir computing system 100.

Such a nonlinear signal path 50 can be realized by a combination of the oscillator 52 that can be integrated with a semiconductor and the nonlinear transducer 54 that can be formed with a diameter of approximately several hundred nanometers, and therefore the reservoir can be realized easily as a miniature device. Furthermore, the nonlinear signal path 50 generates the nonlinear signal after converting the input voltage I(t) into a frequency using the oscillator 52, without causing the device to operate in a high-output region, and therefore a device with low power consumption can be realized.

For example, the ferromagnetic resonance of such a nonlinear signal path 50 can be generated with a very small power of just approximately 1 nW to 1 μW, and therefore it is possible to realize a reservoir with low power consumption. If the reservoir can be formed as a miniature device, it is possible to realize stable operation by further providing a temperature control section or the like that keeps this reservoir at a reference temperature or the like.

The nonlinear signal path 50 according to the present embodiment described above can adjust the position of the peak of the nonlinear output signal o(t) by adjusting the bias voltage v serving as the offset. In other words, the reservoir using such a nonlinear signal path 50 can adjust the nonlinear characteristic of the nonlinear signal path 50 in advance according to the learning target, to optimize the connections inside the reservoir. In particular, the reservoir may use a signal of the learning target to perform self-organization and optimization. Such a reservoir is described in the following as a self-organizing reservoir (SOR).

Figure 5:
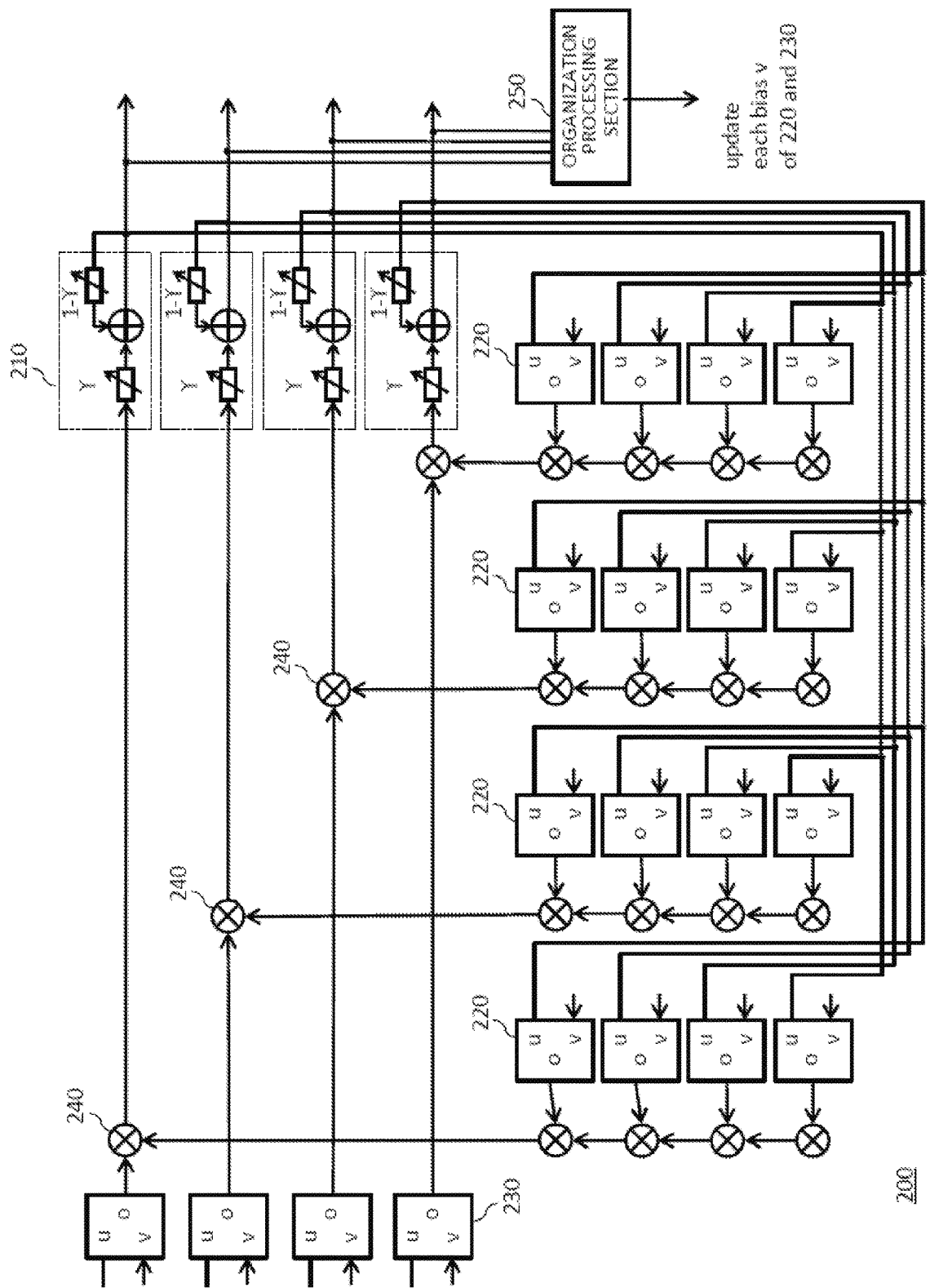
FIG. 5 shows an exemplary configuration of a reservoir layer 200 according to the present embodiment.

FIG. 5 shows an exemplary configuration of a reservoir layer 200 according to the present embodiment. The reservoir layer 200 includes therein nonlinear signal paths 50 that use physical resonance phenomena, and has a nonlinear input/output characteristic. The reservoir layer 200 may operate as the reservoir 130 shown in FIG. 1. In this case, the input layer 120 may be operable to output the input layer signal corresponding to the input data and the reservoir layer 200 may be operable to output the inherent reservoir layer signal corresponding to this input layer signal. Furthermore, the output layer 140 may output the output data corresponding to the reservoir layer signal. In this way, the reservoir computing system 100 may be configured as an SOR computing system.

The reservoir layer 200 includes a plurality of neurons 210, a plurality of first nonlinear signal paths 220, a plurality of second nonlinear signal paths 230, a plurality of multiplication circuits 240, and an organization processing section 250.

Each neuron 210 may output a reservoir layer signal. Here, the reservoir layer signal that is output n-th in order of time by the i-th neuron 210 is labeled as $x_i(n)$. Furthermore, the signal input to each neuron 210 is labeled as $x_i^h(n)$. FIG. 5 shows an example in which the reservoir layer 200 includes four neurons 210. Each neuron 210 may output an n-th reservoir layer signal $x_i(n)$ in response to an n-th input value $x_i^h(n)$ and an immediately prior (n−1)-th reservoir layer signal $x_i(n-1)$. As an example, each neuron 210 may output a reservoir layer signal $x_i(n)$ shown in the expression below.

$$x_i(n)=(1-\gamma)\cdot x_i(n-1)+\gamma\cdot x_i^h(n)$$ Expression 2:

Here, γ may be a time constant that has a value between 0 and 1 and attenuates the signal value. The neurons 210 may each use substantially the same time constant γ. Instead, at least some of the neurons 210 among the plurality of neurons 210 may attenuate the neuron values (the input values and the immediately prior reservoir layer signal values) using time constants γ differing from the time constants γ of other neurons 210. In this way, the neurons 210 add a portion of the input signals to the continuing signals, and therefore function as a fading memory. In other words, each neuron 210 may function as a leaky-integration neuron. Form this viewpoint, the time constant γ may be referred to as the leaking rate.

The time constants γ of the neurons 210 may be adjusted in advance. Furthermore, if at least some neurons 210 among the plurality of neurons 210 use time constants γ differing from the time constants γ of other neurons 210, the time constant $\gamma_i$ of the neuron i may be determined in advance. Each neuron 210 may include a plurality of integrating circuits and adding units. Each neuron 210 may be operable to adjust the value of the time constant γ by adjusting the capacitance values or the like of the integrating circuits.

Each of the nonlinear signal paths may be provided to be, at least one of, between the input layer 120 and at least some of the neurons 210 among the plurality of neurons 210 and between at least some neurons 210 among the plurality of neurons 210. Each nonlinear signal path may be the nonlinear signal path 50 described in FIG. 2 to FIG. 4. The nonlinear signal paths may be used as elements that output the signal o(t) according to the input signal u(t) and the bias voltage v. For example, the nonlinear signal paths may function as synapses that transfer signals between the neurons.

As an example, the first nonlinear signal paths 220 may be provided between at least some of the neurons 210 among the plurality of neurons 210. In other words, the first nonlinear signal paths 220 may transfer the signals output by each of at least some of the neurons 210 among the plurality of neurons 210 to each of at least some of the neurons among the plurality of neurons 210. FIG. 5 shows an example in which each of a total of 16 first nonlinear signal paths 220 receives a signal output by any one of four neurons 210 and transfers the signal o(t) corresponding to the received signal to any one of these four neurons 210.

As shown in the example of FIG. 5, if a plurality of first nonlinear signal paths 220 each transfers a signal o(t) to one neuron 210, a first signal that is the product of the plurality of signals o(t) may be transferred to this one neuron 210. In this case, one or more multiplication circuits 240 may be provided downstream from the first nonlinear signal paths 220 to generate the first signal. FIG. 5 shows an example in which four first nonlinear signal paths 220 each transfer a signal o(t) to one neuron 210. Accordingly, FIG. 5 shows an example in which three multiplication circuits 240 are provided downstream from these four first nonlinear signal paths 220 to transfer the product of the four signals o(t) as the first signal to this one neuron 210.

Similarly, as an example, a plurality of second nonlinear signal paths 230 may be provided between the input layer 120 and at least some of the neurons 210 among the plurality of neurons 210. In other words, the second nonlinear signal paths 230 may transfer the input layer signals output by the one or more input nodes 10 of the input layer 120 to each of at least some of the neurons among the plurality of neurons 210. FIG. 5 shows an example in which each of a total of four second nonlinear signal paths 230 transfers a signal o(t) corresponding to the input layer signal output by one input node 10 to any one of these four neurons 210.

If the input layer 120 includes a plurality of input nodes 10 and a plurality of second nonlinear signal paths 230 each transfer a signal o(t) to one neuron 210, this one neuron 210 may transfer a second signal that is the product of the plurality of signals o(t). In this case, one or more multiplication circuits 240 may be provided downstream from the second nonlinear signal paths 230 to generate the second signal.

In the manner described above, the neurons 210 may output the nonlinear signals transferred from the first nonlinear signal paths 220 and the second nonlinear signal paths 230 as the input signals $x_i^h$. Each neuron 210 may update the neuron value according to the product of the signals input thereto from the nonlinear signal paths connected to this neuron from among the first nonlinear signal paths 220 and the second nonlinear signal paths 230.

As an example, one neuron 210 may set, as the input signal $x_i^h(n)$ at one time point n, the product of the first signal transferred from one or more first nonlinear signal paths 220 and the second signal transferred from one or more second nonlinear signal paths 230. In this case, one or more multiplication circuits 240 may be provided between the one or more first nonlinear signal paths 220 and the one or more second nonlinear signal paths 230, to calculate and output the input signal $x_i^h(n)$.

In the manner described above, the first nonlinear signal paths 220, the second nonlinear signal paths 230, and the multiplication circuits 240 may supply the neurons 210 with the input signals $x_i^h(n)$ corresponding to the input layer signals and the reservoir layer signals. Such an input signal $x_i^h(n)$ may be calculated as shown in the expression below, for example.

$$x_i^h(n) = \prod_k^{N_u} L^{in}(u_k(n) + v_{ik}) \cdot \prod_l^{N_x} L^{rec}(x_l(n-1) + v_{il}) \quad \text{Expression 3}$$

Here, the function $L^{rec}(\ )$ is a function indicating the outputs of the first nonlinear signal paths 220, and the function $L^{in}(\ )$ is a function indicating the outputs of the second nonlinear signal paths 230. The function $L^{rec}(\ )$ and the function $L^{in}(\ )$ may be functions that output nonlinear signals similar to those of Expression 1. The input layer signal input to the 1-th first nonlinear signal path 220 is indicated by $x_l(n-1)$, and the input layer signal input to the k-th second nonlinear signal path 230 is indicated by $u_k(n)$. Furthermore, the bias voltage input to the 1-th first nonlinear signal path 220 is indicated by $v_{il}$, and the bias voltage input to the k-th second nonlinear signal path 230 is indicated by $v_{ik}$.

The organization processing section 250 may organize the reservoir layer 200 based on the reservoir layer signal output by the reservoir layer 200 into which the training input layer signal is input. The organization processing section 250 may update the bias voltages based on the reservoir layer signals output by the reservoir layer 200 into which the training input layer signals are input. For example, the organization processing section 250 updates the plurality of bias voltages $v_{ik}$ and $v_{il}$ based on the reservoir layer signals $x_i(n)$ output by the reservoir layer 200 in response to the training input layer signals $u_k^{trn1}(n)$.

The organization processing section 250 may include a circuit that processes a predetermined algorithm. As an example, the organization processing section 250 may include an FPGA or the like. Furthermore, the organization processing section 250 may include an AD converter or the like to acquire the reservoir layer signal.

The reservoir layer 200 according to the present embodiment described above can output a nonlinear signal according to the input layer signal, and therefore can be used as the reservoir 130 shown in FIG. 1. Furthermore, the reservoir layer 200 can adjust the bias voltage v of the nonlinear signal path 50 according to the training input layer signal, thereby optimizing the connections inside the reservoir layer 200. The following describes the learning operation of the reservoir computing system 100 using such a reservoir layer 200, as well as the optimization of the reservoir layer 200.

Figure 6:
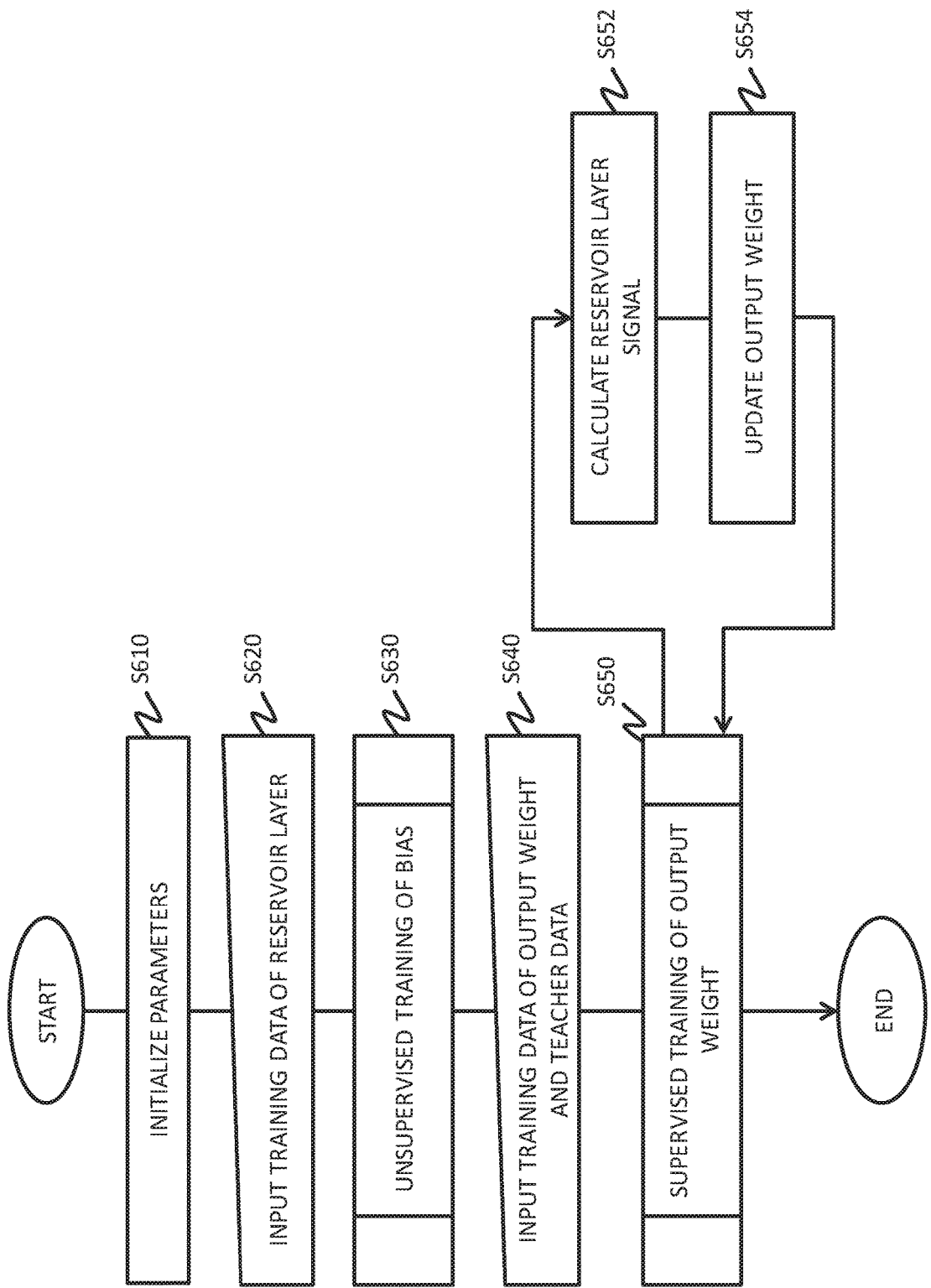
FIG. 6 shows an exemplary operational flow of the reservoir computing system 100 according to the present embodiment.

FIG. 6 shows an exemplary operational flow of the reservoir computing system 100 according to the present embodiment. In the present embodiment, the reservoir computing system 100 may be operable to perform learning by executing the processes from S610 to S650.

First, the reservoir computing system 100 may initialize the parameters or the like to be learned (S610). For example, the organization processing section 250 initializes the plurality of bias voltages $v_{ik}$ and $v_{il}$ of the reservoir layer 200. The organization processing section 250 may supply each of the nonlinear signal paths with a random voltage value, within a range of voltage to be supplied as bias voltages. Alternatively, the organization processing section 250 may supply each nonlinear signal path with a predetermined initial value. As another example, the organization processing section 250 may supply each nonlinear signal path with a bias voltage updated according to the previous learning operation.

The reservoir computing system 100 may initialize the weights of the adaptive filter 150 in a similar manner. If there are weights that are to be set between the input layer 120 and the reservoir layer 200, the reservoir computing system 100 may initialize these weights. The weights between the input layer 120 and the reservoir layer 200 do not need to be changed due to the learning after being determined once.

Next, the reservoir computing system 100 supplies the reservoir layer 200 with the training input layer signals $u_k^{trn1}(n)$ for the reservoir layer 200 (S620). The data generator 110 may generate the input layer signals $u_k^{trn1}(n)$ and supply these signals to the input layer 120.

Next, the organization processing section 250 determines the bias voltages $v_{ik}$ and $v_{il}$, which are the weights of the reservoir layer 200, through unsupervised pre-training (S630). The unsupervised pre-training is described further below. The bias voltages $v_{ik}$ and $v_{il}$ do not need to be changed due to further learning after being determined once through learning.

Next, the data generator 110 generates the training input data $u_k^{trn2}(n)$ of the adaptive filter 150, and supplies these data to the input layer 120 (S640). Here, the data generator 110 may generate expected output data D(n) corresponding to the training input data $u_k^{trn2}(n)$ supplied to the input layer 120, and supply these expected output data D(n) to the comparing section 160. The training input data $u_k^{trn2}(n)$ and the expected output data D(n) may each be time-series data.

Next, the reservoir computing system 100 learns the weights of the adaptive filter 150 (S650). Here, the number of output nodes 20 of the output layer 140 may be i, which corresponds to the number i of neurons 210, and the number of weights may also be i. The reservoir computing system 100 may update the weights $W_i$ through supervised pre-training. The supervised pre-training may be performed in the following manner.

The reservoir layer 200 calculates the reservoir layer signals $x_i(n)$ corresponding to the input data $u_k^{trn2}(n)$, for example (S652). Here, if the input data $u_k^{trn2}(n)$ is time-series data, the reservoir layer signals $x_i(n)$ are also time-series data. The adaptive filter 150 may calculate the sum of the results obtained by multiplying each reservoir layer signal $x_i(n)$ by the corresponding weight $W_i$, configuring the result as one-dimensional time-series data, and outputting these data as the output data X(n).

Next, the learning processing section 170 may update the weights $W_i$ of the adaptive filter 150 (S654). The learning processing section 170 may update the weights $W_i$ in a manner to reduce the error between the expected output data D(n) and the output data X(n). The learning processing section 170 may update the weights $W_i$ of the adaptive filter 150 such that the output data approach the expected output data, using linear regression such as the least squares technique. In this case, the learning processing section 170 may include a linear filter, and update the weights $W_i$ by performing filtering.

The reservoir computing system 100 stores the output data with an approximate length enabling the update of the weights $W_i$ in time series, for example. The reservoir computing system 100 may then use the stored time-series output data to update the weights $W_i$ such that the weights $W_i$ become reasonable values. Instead of this, the reservoir computing system 100 may determine the weights $W_i$ by repeating the updates of the weights $W_i$.

As a result of the operation flow described above, the reservoir computing system 100 may end the learning and determine the most recently updated weights to be the weights of the adaptive filter 150. The reservoir computing system 100 may store the determined weights in an internal storage section, an external database 1000, and/or the like. The following describes the learning operation of the reservoir layer 200.

Figure 7:
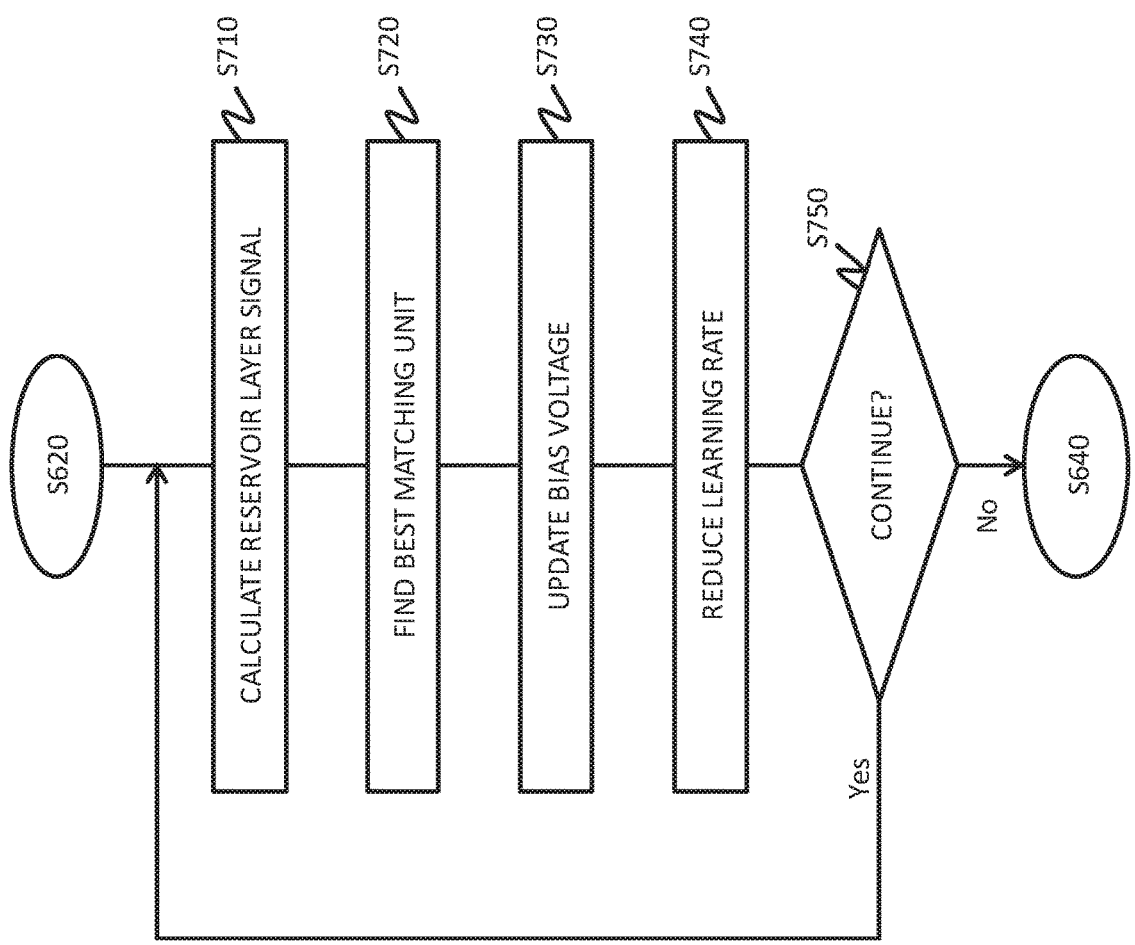
FIG. 7 shows an exemplary operational flow of the reservoir layer 200 according to the present embodiment.

FIG. 7 shows an exemplary operational flow of the reservoir layer 200 according to the present embodiment. In the present embodiment, the reservoir layer 200 may be operable to perform self-organization by executing the processes from S710 to S740, as the operation of S630 shown in FIG. 6.

First, the reservoir layer 200 may calculate the reservoir layer signals $x_i(n)$ for the training input layer signals $u_k^{trn1}(n)$ (S710). The reservoir layer 200 may output the reservoir layer signals $x_i(n)$ arranged in time series, according to the input layer signals $u_k^{trn1}(n)$ arranged in time series. The reservoir layer 200 may calculate the reservoir layer signals $x_i(n)$ using Expression 2 and Expression 3.

Next, the organization processing section 250 may search for a neuron 210 that is a best matching unit (BMU) for the training input layer signal $u_k^{trn1}(n)$, among the plurality of neurons 210 reservoir layer signal in response to the input of the training input layer signal $u_k^{trn1}(n)$ to the reservoir layer 200, from among the plurality of neurons 210, as the BMU.

Next, the organization processing section 250 may update the bias voltages of the nonlinear signal paths that transfer the nonlinear signals to the neurons 210 that are not the BMU, according to the bias voltage of the nonlinear signal path that transfers the nonlinear signal to the BMU (S730). The organization processing section 250 may update the bias voltages such that larger reservoir layer signals are output from the neurons adjacent to the BMU.

As an example, the organization processing section 250 may supply the nonlinear signal paths that transfer the nonlinear signals to the neurons 210 adjacent to the BMU with bias voltages that are substantially the same as the bias voltage of the nonlinear signal paths that transfers the nonlinear signal to the BMU. Instead of this, the organization processing section 250 may use the output signal of the neurons 210 as-is as the source for updating the bias voltage. In this case, it is possible to perform learning with high efficiency, such that the weight of the BMU itself becomes the output signal of the neuron 210. In this way, it becomes easier for the BMU to output the maximum reservoir layer signal, and therefore the reservoir layer 200 can perform the self-organization.

Furthermore, as an example, the organization processing section 250 may update the bias voltages of the nonlinear signal paths as shown in the expression below.

$$\begin{cases} v_i^{rec}(n) = v_i^{rec}(n) + \eta \cdot h_i(n) \cdot (x(n) - v_i^{rec}(n)) \\ v_i^{in}(n) = v_i^{in}(n) + \eta \cdot h_i(n) \cdot (u(n) - v_i^{in}(n)) \end{cases} \quad \text{Expression 4}$$

Here, $h_i(n)$ may be a gradient distribution function formed by a number greater than 0. Furthermore, $\eta$ may be a positive number less than or equal to 1, and may be a learning rate whose value approaches 0 according to the progression of the learning. The reservoir layer 200 may, after reducing the value of $\eta$ (S740), return to S710 and repeat the learning of this reservoir layer 200. The organization processing section 250 may reduce the value of $\eta$ according to a predetermined algorithm or the like (S750: Yes). The reservoir layer 200 may end the learning in response to the value of $\eta$ becoming smaller than a predetermined threshold value (S750: No). Instead of this, the reservoir layer 200 may repeat the learning a predetermined number of times, and then end this learning.

In the manner described above, the reservoir computing system 100 according to the present embodiment may perform the two-stage pre-learning. By inputting test input data after the learning has ended, the reservoir computing system 100 can output test results or prediction results for these test input data.

Figure 8:
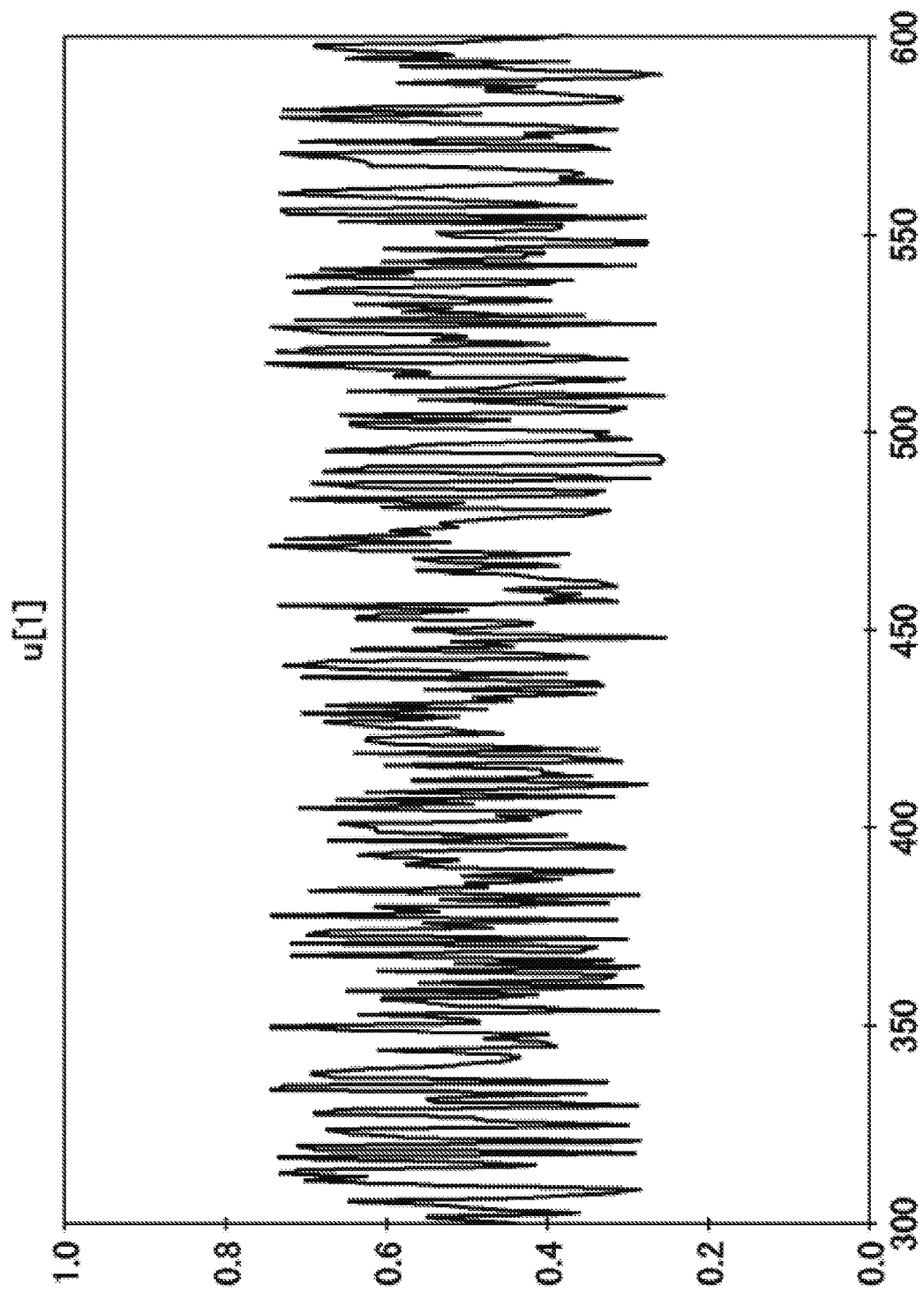
FIG. 8 shows exemplary test input data of the reservoir computing system 100 according to the present embodiment.

FIG. 8 shows exemplary test input data of the reservoir computing system 100 according to the present embodiment. The test input data are time-series data randomly generated within the range from 0 to 0.5, and the output teacher data may be calculated from the expression below.

$$y(n+1) = \qquad \text{Expression 5}$$
$$0.3y(n) + 0.05y(n)\sum_{i=0}^{9} y(n-i) + 1.5u(n-9)u(n) + 0.1$$

Here, y(n) indicates the expected output data. The expected output data y(n) in Expression 5 are used in a benchmark or the like for reservoir computing, and are a task of the estimation of a nonlinear system known as a NARMA-10th order system. Here, NARMA stands for Nonlinear Auto-Regressive Moving Average. FIG. 8 shows exemplary test input data u(n) in the NARMA-10th order system.

Figure 9:
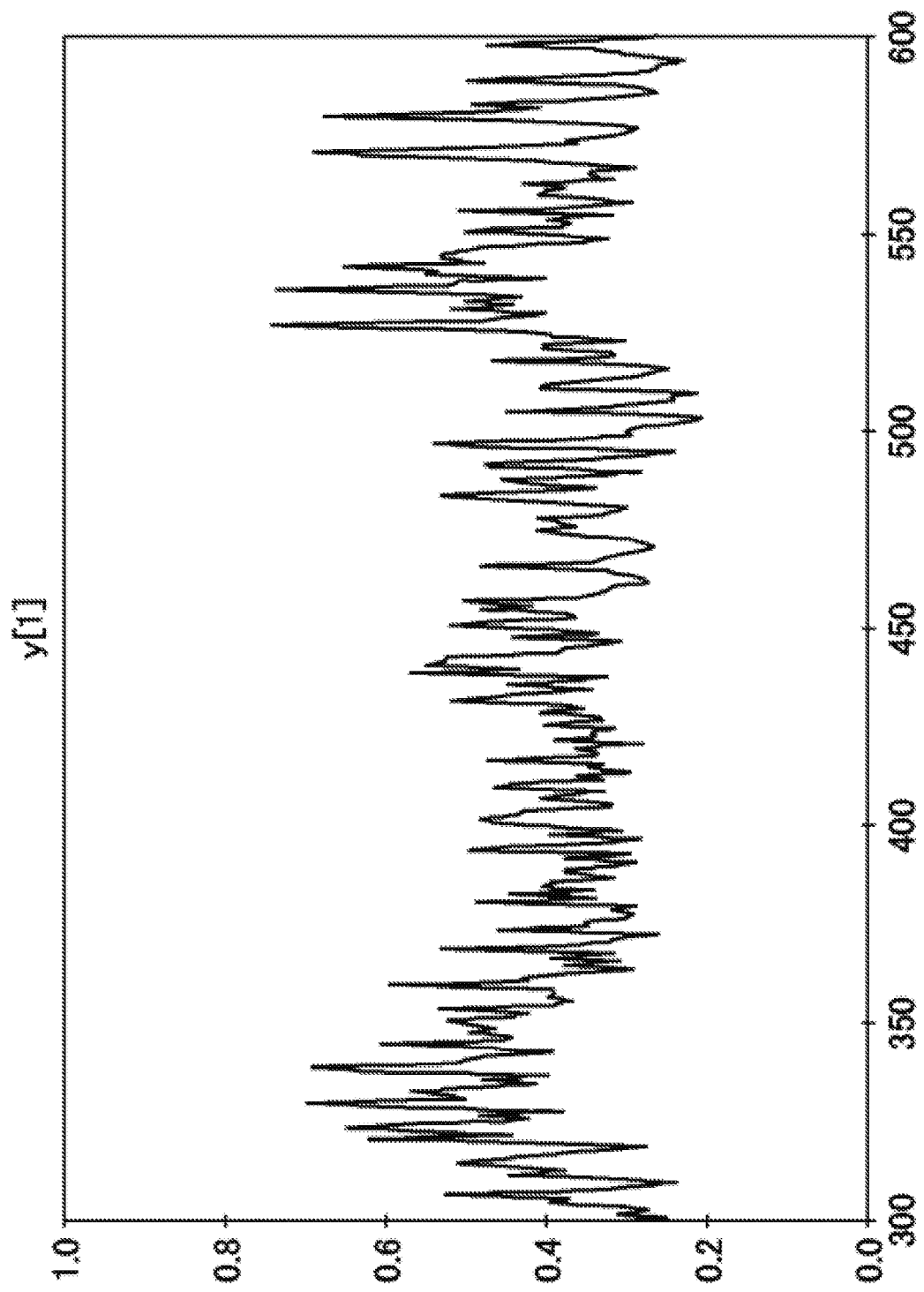
FIG. 9 shows exemplary test teacher data of the reservoir computing system 100 according to the present embodiment.

FIG. 9 shows exemplary test teacher data of the reservoir computing system 100 according to the present embodiment. FIG. 9 shows exemplary test teacher data in the NARMA-10th order system. In FIG. 9, the horizontal axis indicates time and the vertical axis indicates the signal strength. The reservoir computing system 100 is shown to have realized more accurate learning when the output signal $y^h(n)$ for the input of the input data u(n) is closer to the teacher data y(n) after the learning.

Figure 10:
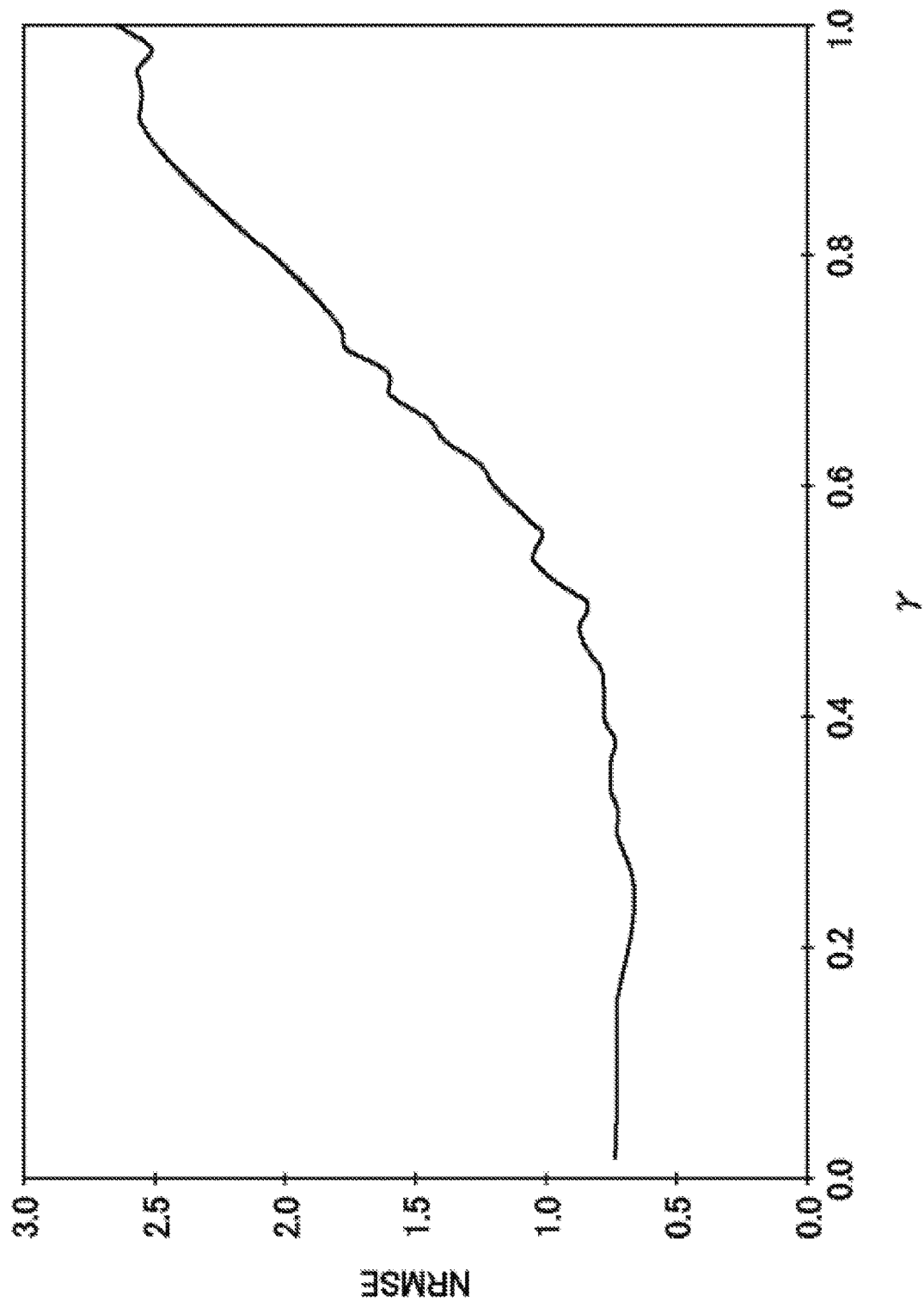
FIG. 10 shows a first example of test results of the reservoir computing system 100 according to the present embodiment.

FIG. 10 shows a first example of test results of the reservoir computing system 100 according to the present embodiment. In FIG. 10, the horizontal axis indicates the time constant $\gamma$. In other words, FIG. 10 shows an example of test results in a case where the time constant $\gamma$ of each of the neurons 210 is substantially the same value and the input data u(n) are input after learning for every γ.

In FIG. 10, the vertical evaluation axis indicates an error evaluation value. The error evaluation value is the normalized root mean square error (NRMSE). The NRMSE is shown in the following expression.

$$NRMSE = \sqrt{\frac{\langle(y-y^h)^2\rangle}{\langle(y-\langle y\rangle)^2\rangle}} \quad \text{Expression 6}$$

In Expression 6, the expected output data, which are the teacher data, are indicated by y and the output data are indicated by $y^h$. In other words, the denominator in Expression 6 indicates the standard deviation of the expected output data y, and the numerator indicates the expected value of the square of the error $y-y^h$. The evaluation value NRMSE indicates that the learning is having an effect when the value is less than 1, and indicates higher performance when the value is closer to 0. In other words, the evaluation value NRMSE is an evaluation value that approaches 0 as the error $y-y^h$ becomes smaller.

From the test results of the reservoir computing system 100, it is understood that the evaluation value NRMSE differs greatly according to the time constant γ. Specifically, it is understood that the reservoir computing system 100 can accurately learn the time-series data by suitably adjusting the time constant γ according to the characteristics such as most of the time constants in the time-series data of the learning target. For example, in the case of the example shown in FIG. 10, it is understood that accurate learning is possible by making the time constant γ be approximately less than or equal to 0.4.

Figure 11:
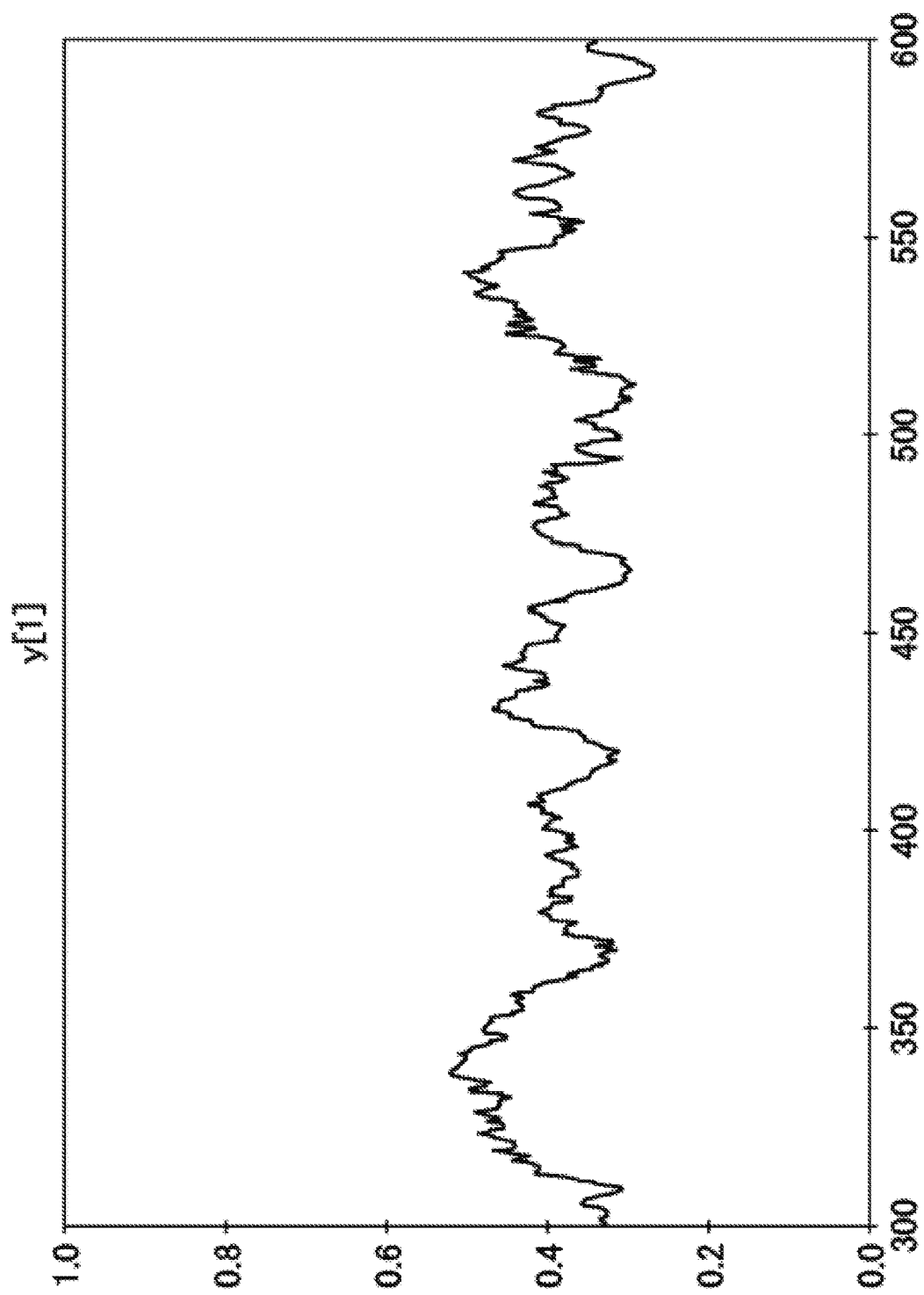
FIG. 11 shows a second example of test results of the reservoir computing system 100 according to the present embodiment.

FIG. 11 shows a second example of test results of the reservoir computing system 100 according to the present embodiment. In FIG. 11, the horizontal axis indicates the time constant γ and the vertical axis indicates the signal strength. FIG. 11 shows an example of the output signal $y^h(n)$ in a case where the time constant γ of each neuron 210 is 0.1. It is understood that the output signal $y^h(n)$ has a waveform corresponding to the signal waveform of the teacher data y(n) shown in FIG. 9, such that accurate learning was achieved.

On the other hand, the output signal $y^h(n)$ shown in FIG. 11 includes a portion where the small fluctuations, peaks, and the like of the signal strength do not correspond to the teacher data y(n). This is believed to be because, as a result of the time constants γ of the neurons 210 being a single value, it is difficult to perform the learning for a waveform of a time constant differing from the time constant γ. Therefore, reservoir layers 200 with different time constants γ may be connected in cascade to form the reservoir computing system 100.

Instead, the reservoir layer 200 may set the time constants γ of the neurons 210 to be different values. For example, the reservoir layer 200 may set the time constants $γ_i$ of i neurons 210 to be different values from each other. The reservoir layer 200 may set the difference between the time constants of neurons among the plurality of neurons 210 to be an integer multiple of the smallest difference value among the time constants $γ_i$. For example, the reservoir layer 200 may set the quotient obtained by dividing 1 by the number i of neurons 210 to be the integer multiple, and set values between 0 and 1 (0<m/i≤1) as the time constants $γ_i$. Instead, the reservoir layer 200 may create a distribution in the changes of the time constants $γ_i$ of the neurons 210.

In this way, the reservoir layer 200 according to the present embodiment can hold a plurality of time constants $γ_i$, and therefore it is possible to configure a reservoir computing system 100 with rich expressive power without using a redundant reservoir. Furthermore, if using the reservoir layer 200 that includes a plurality of time constants $γ_i$, the reservoir computing system 100 can make the adjustment of time constants unnecessary. Accordingly, the reservoir computing system 100 can accurately and easily perform learning for a learning target that has various characteristics.

Figure 12:
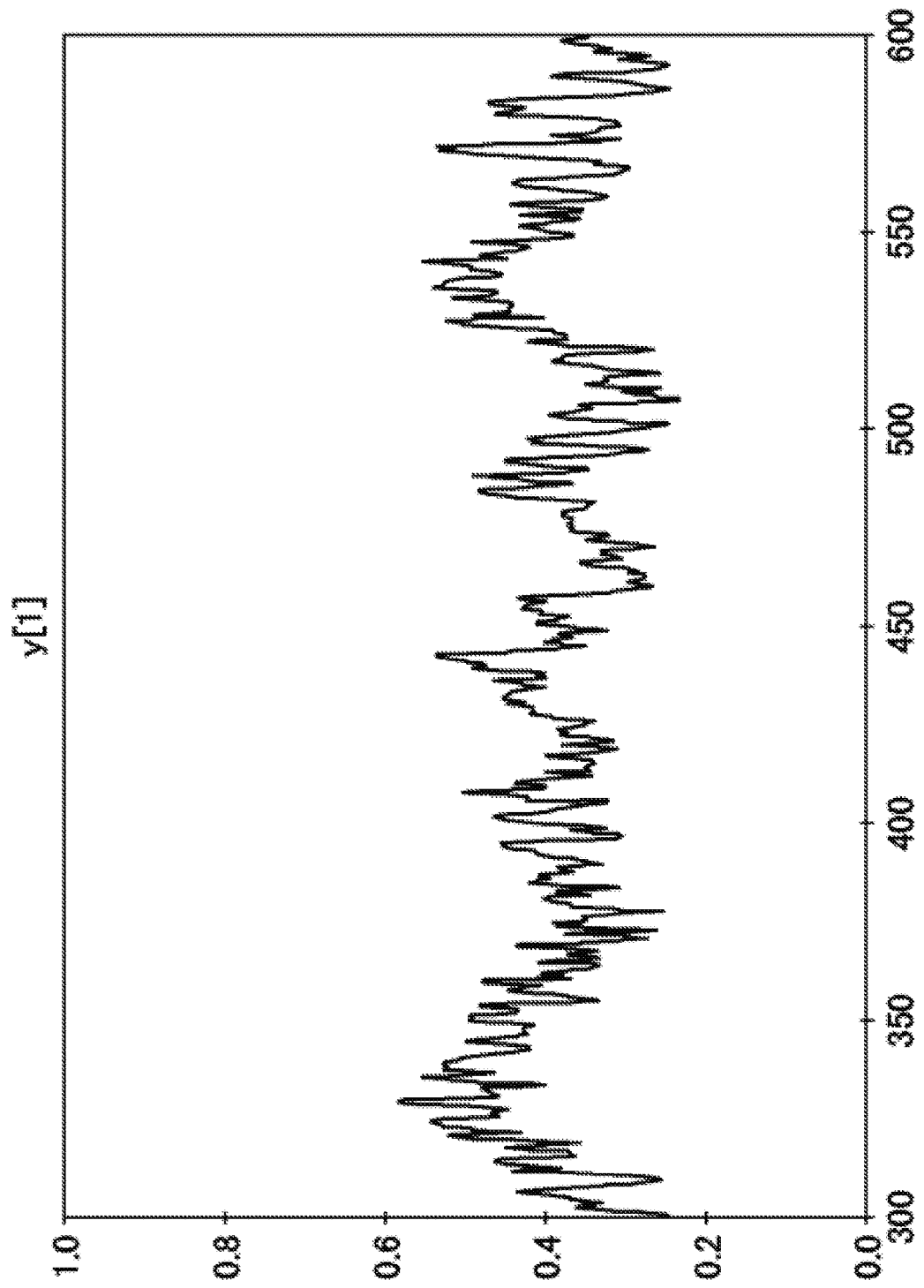
FIG. 12 shows a third example of test results of the reservoir computing system 100 according to the present embodiment.

FIG. 12 shows a third example of test results of the reservoir computing system 100 according to the present embodiment. In FIG. 12, the horizontal axis indicates the time constant γ and the vertical axis indicates the signal strength. FIG. 12 shows an example of the output signal $y^h(n)$ in a case where the time constants $γ_i$ of 20 neurons 210 differ respectively by 0.05. It is understood that the output signal $y^h(n)$ has a waveform corresponding to the signal waveform of the teacher data y(n) shown in FIG. 9, such that accurate learning was achieved. Furthermore, it is understood that the output signal $y^h(n)$ shown in FIG. 12 corresponds more closely to the teacher data y(n) with regard to the small fluctuations, peaks, and the like of the signal strength, as compared to the output signal $y^h(n)$ shown in FIG. 11, such that more accurate learning is possible.

The reservoir computing system 100 according to the present embodiment above is described as an example in which a plurality of time constants $γ_i$ are set in advance, but the present invention is not limited to this. The reservoir computing system 100 may optimize the time constants $γ_i$ through learning. For example, the organization processing section 250 may perform self-organization such that the time constant of at least one neuron 210 among the plurality of neurons 210 becomes closer to the time constant of a neuron whose output is large when provided with the training data. In this way, optimization of the reservoir layer 200 can be performed easily.

The reservoir computing system 100 according to the present embodiment described above uses the reservoir layer 200 that can be optimized through self-organization, and can therefore easily adapt even to large changes in the learning target by performing the self-organization. Furthermore, as an example, even if the resonance characteristics of the nonlinear signal paths fluctuate due to environmental fluctuations, impacts, damage, deterioration over time, or the like, the reservoir layer 200 can easily perform the optimization for the characteristics of the nonlinear signal paths that fluctuate, by performing the self-organization.

The reservoir computing system 100 may perform the self-organization periodically or if a malfunction or the like is detected. For example, the reservoir computing system 100 may further include a deterioration detecting section that detects deterioration of the reservoir layer 200 based on the change due to aging of the reservoir layer signal output by the reservoir layer 200 into which a test input layer signal is input.

The deterioration detecting section may be included in the organization processing section 250, or instead may be connected to the organization processing section 250 and receive information concerning the self-organization performed in the past by the reservoir layer 200. For example, the deterioration detecting section may store the test input layer signal and the reservoir layer signal occurring when the reservoir layer 200 performed self-organization in the past. The deterioration detecting section may be operable to then detect deterioration of the reservoir layer 200 in response to the reservoir layer signal changing despite having the same test input layer signal. In this way, the reservoir computing system 100 can maintain stable operation over a long period of time.

The reservoir computing system 100 may further include a temperature control section to reduce the environmental fluctuation. The temperature control section may perform control to keep the temperature of the reservoir layer 200 at a reference temperature. The reservoir layer 200 can be manufactured to be miniature, and therefore the temperature control section can be a miniaturized temperature detecting section, heater, cooler, and/or the like to easily control the temperature. Furthermore, at least a portion of the temperature control section may be integrated with a portion of the reservoir layer 200.

Figure 13:
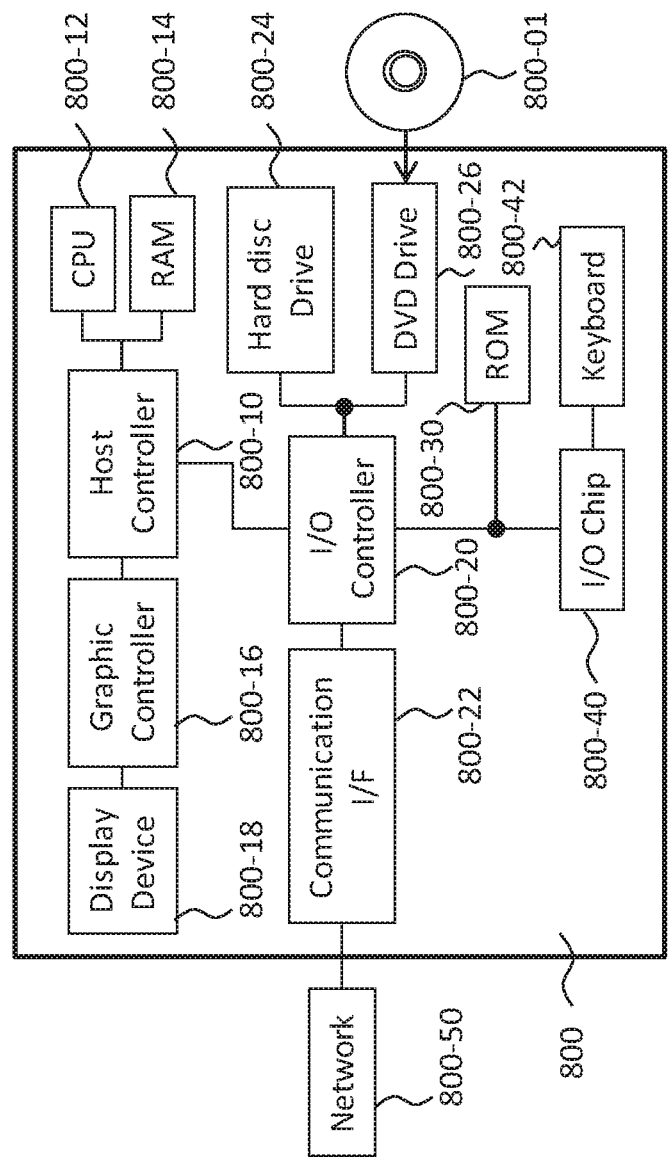
FIG. 13 shows an exemplary hardware configuration of a computer according to the embodiment of the invention.

FIG. 13 shows an exemplary hardware configuration of a computer according to the embodiment of the invention. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800.

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14. In addition, the CPU 800-12 may search for information in a file, a database, etc., in the recording medium. For example, when a plurality of entries, each having an attribute value of a first attribute that is associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can realize a nonlinear input/output characteristic while achieving a small size and low cost, and can be adopted as a reservoir when a reservoir computing system is implemented as actual hardware.

What is claimed is:

1. A self-organizing reservoir (SOR) computing system, comprising:
   a data generator that generates input data and expected output data;
   an input layer that outputs an input layer signal corresponding to the input data;
   a reservoir layer that includes a plurality of neurons, a plurality of first non-linear signal paths, a plurality of second non-linear paths, a plurality of multiplication circuits, and an organization processor, wherein each neuron of the plurality of neurons outputs a reservoir layer signal;
   an output layer that outputs output data corresponding to the reservoir layer signal;
   an adaptive filter for applying adaptive filter weights corresponding to respective output values output by each node of the output layer to produce adaptive filter output data;
   a comparator that compares the expected output data generated by the data generator to the adaptive filter output data to provide an error defined as a difference between the expected output data and the adaptive filter output data; and
   a learning processor that learns the adaptive filter weights according to the error provided by the comparator,
   wherein the plurality of first non-linear signal paths, the plurality of second non-linear paths, and the plurality of multiplication circuits supply the plurality of neurons with input signals corresponding to the input layer signals and the reservoir layer signals, the input signals given as:

$$x_i^h(n) = \prod_k^{N_u} L^{in}(u_k(n) + v_{ik}) \cdot \prod_l^{N_x} L^{rec}(x_i(n-1) + v_{il})$$

where function $L^{rec}(\ )$ is a function indicating outputs of the first nonlinear signal paths, function $L^{in}(\ )$ is a function indicating outputs of the second nonlinear signal paths, n is a neuron of the plurality of neurons, i is the ith neuron, $u_k$ is an input layer signal to a kth second nonlinear signal path, $x_l$ is an input layer signal to an lth nonlinear signal path, and $v_{ik}$, $v_{ik}$ are bias voltages.

2. The SOR computing system according to claim 1, wherein the first and second nonlinear signal paths output a nonlinear signal based on a nonlinear Lorentz function.

3. The SOR computing system according to claim 1, wherein the first and second nonlinear signal paths include:
   an oscillator that outputs a signal with a frequency corresponding to an input signal; and
   a nonlinear transducer that outputs a signal that is nonlinear with respect to the frequency of the signal output by the oscillator.

4. The SOR computing system according to claim 3, wherein the nonlinear transducer includes a spin torque diode (STD) that outputs a signal with a voltage that is nonlinear with respect to the frequency of the signal output by the oscillator.

5. The SOR computing system according to claim 3, wherein the oscillator is a voltage controlled oscillator (VCO) that outputs a signal with a frequency corresponding to a voltage of an input signal.

6. The SOR computing system according to claim 5, wherein the oscillator outputs a signal with a frequency corresponding to a voltage that is a sum of a voltage of the input signal and a bias voltage.

7. The SOR computing system according to claim 1, wherein the organization processor organizes the reservoir layer, based on the reservoir layer signal output by the reservoir layer.

8. The SOR computing system according to claim 7, wherein the organization processor updates the bias voltage based on the reservoir layer signal output by the reservoir layer.

9. The SOR computing system according to claim 1, wherein the reservoir layer signal is given as:

$$x_i(n) = (1-\gamma) \cdot x_i(n-1) + \gamma \cdot x_i^h(n)$$

where $\gamma$ is a time constant having a value between 0 and 1, and attenuates a signal value, n is a neuron of the plurality of neurons, and $x_i$, $x_i^h$ are input signals.

10. The SOR computing system according to claim 9, wherein each of the plurality of neurons uses a different time constant.

11. The SOR computing system according to claim 10, wherein each of the plurality of neurons functions as a fading memory.

12. The SOR computing system according to claim 10, wherein each of the plurality of neurons functions as a leaky-integration neuron.

13. The SOR computing system according to claim 10, wherein each of the different time constants are adjusted in advance.

14. The SOR computing system according to claim 13, wherein each of the different time constants are adjusted by changing capacitance values of integrating circuits associated with each neuron of the plurality of neurons.

15. The SOR computing system according to claim 1, further comprising:
   a temperature controller that performs control to keep a temperature of the reservoir layer at a reference temperature.

16. The SOR computing system according to claim 1, further comprising:
   a deterioration detector that detects deterioration of the reservoir layer based on change due to aging of the reservoir layer signal output by the reservoir layer into which the input layer signal for testing is input.

17. A self-organizing reservoir (SOR) computing system comprising:
   a data generator that generates input data and expected output data;
   an input layer that outputs an input layer signal corresponding to the input data;
   a reservoir layer that includes a plurality of neurons, a plurality of first non-linear signal paths, a plurality of second non-linear paths, a plurality of multiplication circuits, and an organization processor, wherein each neuron of the plurality of neurons outputs a reservoir layer signal;
   an output layer that outputs output data corresponding to the reservoir layer signal;

an adaptive filter for applying adaptive filter weights corresponding to respective output values output by each node of the output layer to produce adaptive filter output data;
a comparator that compares the expected output data generated by the data generator to the adaptive filter output data to provide an error defined as a difference between the expected output data and the adaptive filter output data; and
a learning processor that learns the adaptive filter weights according to the error provided by the comparator,
wherein at least some of the neurons among the plurality of neurons attenuate neuron values using time constants that are different from the time constants of other neurons,
wherein the plurality of first non-linear signal paths, the plurality of second non-linear paths, and the plurality of multiplication circuits supply the plurality of neurons with input signals corresponding to the input layer signals and the reservoir layer signals, the input signals given as:

$$x_i^h(n) = \prod_k^{N_u} L^{in}(u_k(n) + v_{ik}) \cdot \prod_l^{N_x} L^{rec}(x_i(n-1) + v_{il})$$

where function $L^{rec}(\ )$ is a function indicating outputs of the first nonlinear signal paths, function $L^{in}(\ )$ is a function indicating outputs of the second nonlinear signal paths, n is a neuron of the plurality of neurons, i is the ith neuron, $u_k$ is an input layer signal to a kth second nonlinear signal path, $x_l$ is an input layer signal to an lth nonlinear signal path, and $v_{ik}$, $v_{ik}$ are bias voltages.

18. The SOR computing system according to claim 17, wherein the reservoir layer signal is given as:

$$x_i(n) = (1-\gamma) \cdot x_i(n-1) + \gamma \cdot x_i^h(n)$$

where $\gamma$ is a time constant having a value between 0 and 1, and attenuates a signal value, n is a neuron of the plurality of neurons, and $x_i$, $x_i^h$ are input signals.

19. A self-organizing method of a reservoir, comprising:
generating, via a data generator, input data and expected output data;
outputting an input layer signal corresponding to the input data;
outputting a reservoir layer that includes a plurality of neurons, a plurality of first non-linear signal paths, a plurality of second non-linear paths, a plurality of multiplication circuits, and an organization processor, wherein each neuron of the plurality of neurons outputs a reservoir layer signal;
outputting, via an output layer, output data corresponding to the reservoir layer signal;
applying, via an adaptive filter, adaptive filter weights corresponding to respective output values output by each node of the output layer to produce adaptive filter output data;
comparing, via a comparator, the expected output data generated by the data generator to the adaptive filter output data to provide an error defined as a difference between the expected output data and the adaptive filter output data; and
learning, via a learning processor, the adaptive filter weights according to the error provided by the comparator,
wherein the plurality of first non-linear signal paths, the plurality of second non-linear paths, and the plurality of multiplication circuits supply the plurality of neurons with input signals corresponding to the input layer signals and the reservoir layer signals, the input signals given as:

$$x_i^h(n) = \prod_k^{N_u} L^{in}(u_k(n) + v_{ik}) \cdot \prod_l^{N_x} L^{rec}(x_i(n-1) + v_{il})$$

where function $L^{rec}(\ )$ is a function indicating outputs of the first nonlinear signal paths, function $L^{in}(\ )$ is a function indicating outputs of the second nonlinear signal paths, n is a neuron of the plurality of neurons, i is the ith neuron, $u_k$ is an input layer signal to a kth second nonlinear signal path, $x_l$ is an input layer signal to an lth nonlinear signal path, and $v_{ik}$, $v_{ik}$ are bias voltages.

* * * * *